(12) United States Patent
Smetz

(10) Patent No.: US 6,547,474 B1
(45) Date of Patent: Apr. 15, 2003

(54) CONNECTING DEVICE

(75) Inventor: Reinhard Smetz, Baldingen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/762,670

(22) PCT Filed: Sep. 3, 1999

(86) PCT No.: PCT/DE99/02863

§ 371 (c)(1),
(2), (4) Date: Feb. 12, 2001

(87) PCT Pub. No.: WO00/13937

PCT Pub. Date: Mar. 16, 2000

(30) Foreign Application Priority Data

Sep. 4, 1998 (DE) .......................................... 198 41 992

(51) Int. Cl.[7] ................ B60P 7/08; B66C 1/66
(52) U.S. Cl. ........................ 403/78; 403/79; 403/150; 403/271; 410/101

(58) Field of Search ............................. 403/78, 79, 119, 403/150, 151, 152, 153, 154, 164, 271, 270; 294/1.1, 89, 82.1; 248/499, 500; 24/115 K; 410/101, 96, 112

(56) References Cited

FOREIGN PATENT DOCUMENTS

| DE | 3 301 960 | 1/1985 |
|----|-----------|--------|
| DE | 3 410 445 | 8/1985 |
| DE | 3 509 877 | 7/1986 |
| DE | 3 803 248 | 3/1989 |
| DE | 297 18 318 | 4/1998 |

Primary Examiner—Christopher J. Novosad
(74) Attorney, Agent, or Firm—Mark P. Stone

(57) ABSTRACT

In a connecting device for binding or lashing having a connecting part (1) and at least one fixing part (2), a number of spacing cams (7) are disposed on the outer surface (6) of the fixing part (2). The position of the spacing cams is selected so that, without regard to the position of the fixing part (2) relative to a base, a minimum clearance is maintained between the base and the fixing part (2) to enable a perfect connection of the fixing part (2) to the base by a root weld.

17 Claims, 2 Drawing Sheets

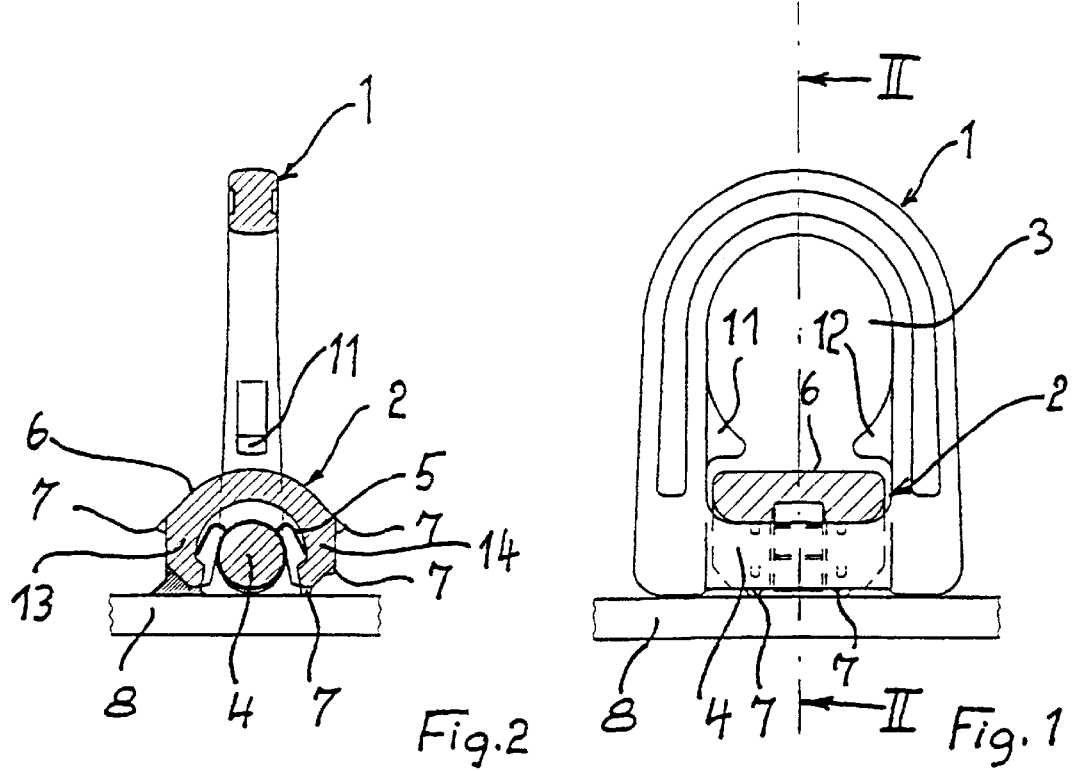
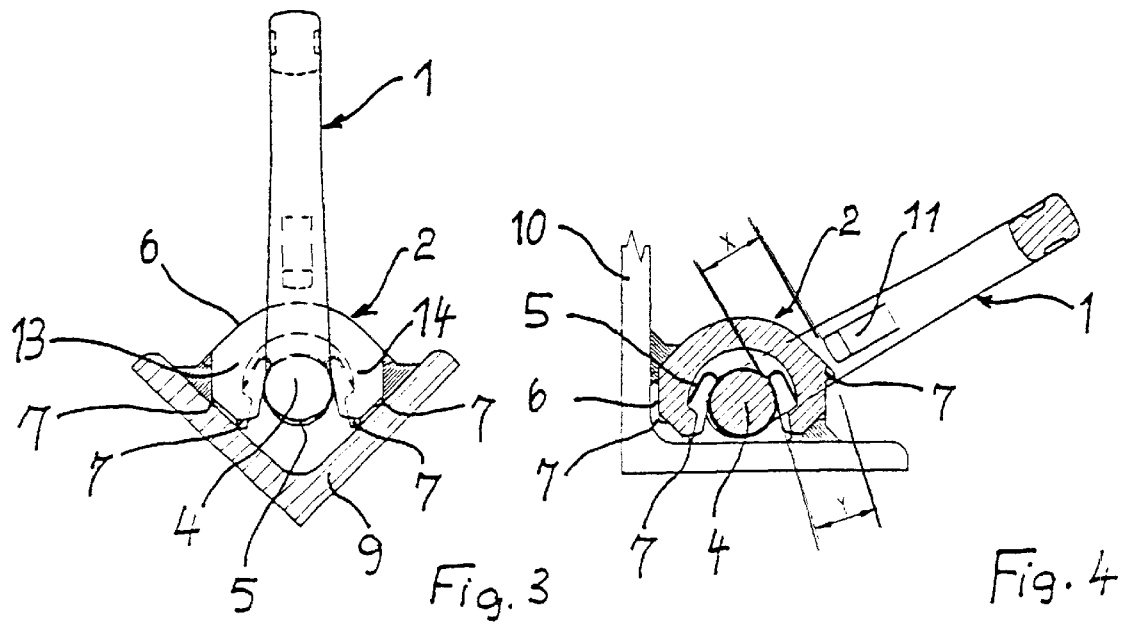

CONNECTING DEVICE

TECHNICAL FIELD

The invention relates to a connecting device for binding or lashing means having a connecting part, which serves for connecting the binding or lashing means, and having at least one fastening part, which serves for fastening the device on a base by a weld connection, said base being formed by an article to be transported, a vehicle part or the like, and which forms a bearing for a pivot pin of the connecting part and has protuberance-like spacing projections which define a minimum clearance for a root weld.

1. Prior Art

DE 35 09 877 C1 discloses a device of the abovementioned type having an essentially D-shaped connecting part and an essentially U-shaped fastening part, in which spacing projections which allow the root weld are arranged on the end surfaces of the legs of the fastening part. In other words, the spacing projections are located at the fastening-part location which takes into account the generally conventional method of attaching relevant connecting devices to a planar base, said method also being known, for example, from DE 33 01 960 C2 and DE 38 03 248 C1.

2. Description of the Invention

The object of the invention is to increase the possible ways of attaching connecting devices of the generic type in question. This object is achieved according to the invention in that the outer surface of the fastening part is provided with a multiplicity of spacing projections such that it is ensured that the minimum clearance is maintained irrespective of the position of the fastening part in relation to the base.

The connecting device according to the invention provides the advantage, which, from the point of view of the practitioner, is not to be underestimated, of adapting the position of a connecting device optimally to the respective conditions. This means that there are no problems, inter alia, in arranging the connecting device either in corners or in V-shaped grooves.

As is known from the abovementioned DE 35 09 877 C1 and DE 38 03 248 C1, it is found to be expedient for the connecting part and the fastening part or parts of a connecting device to be connected to form a captive, largely gap-free unit with the aid of a securing element formed by a spring or a clamping member. In order to ensure that the securing element maintains its position even if the connecting device is installed in hitherto unconventional positions, it is found to be expedient that the connecting part has stops which limit the deformation and/or change in position of the securing element and interact with the outer surface of the fastening part. The stops may also be utilized for a further purpose in that the distance between them and the pivot pin of the connecting part and the wall thickness of the fastening part are coordinated with one another such that it is only possible to combine connecting parts with fastening parts of the same load-bearing capacity.

Further details and features of the invention can be gathered from the subclaims and from the following description of two exemplary embodiments illustrated in the attached drawing.

BRIEF DESCRIPTION OF THE DRAWINGS

In the drawings:

FIG. 1 shows, partly in section, the front view of a first embodiment of a connecting device fastened on a planar base, FIG. 2 shows a section along a line II-II in FIG. 1, FIG. 3 shows the connecting device according to FIGS. 1 and 2 fastened in a 90°-angle profile, FIG. 4 shows the connecting device according to FIGS. 1 and 2 arranged in a corner.

METHODS OF IMPLEMENTING THE INVENTION

Figure 5:
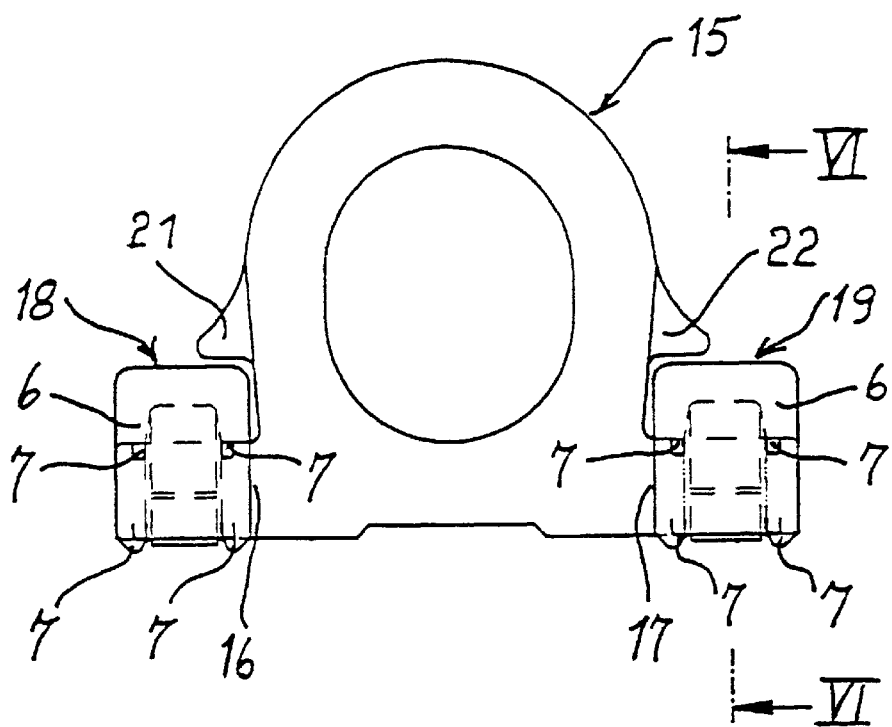
FIG. 5 shows the front view of a modified connecting device.

In FIGS. 1 to 4, 1 is the connecting part and 2 is the fastening part of a connecting device. The connecting part 1 comprises an essentially D-shaped basic body which forms an eyelet 3 into which it is possible to fit an end element, formed for example by a hook or a shackle, of a lashing strap or length of chain serving for lashing or raising a load. The connecting part 1 has a pivot pin 4 which is mounted in the fastening part 2 and is forced into two bearing shells of the fastening part 2 by a securing element 5 comprising an essentially omega-shaped spring. The securing element 5 not only holds the connecting part 1 and the fastening part 2 together, but also prevents aggravating rattling noises of the connecting device when the latter is not in use.

In the region of its outer surface 6, the essentially U-shaped fastening part 2 is provided with a multiplicity of protuberance-like spacing projections 7. The task of said spacing projections 7 is to ensure that a minimum clearance, which is necessary for a satisfactory root weld, is maintained between the fastening part 2 and a base, which is formed by a planar plate 8 in FIGS. 1 and 2, by an angle-profile rail 9 in FIG. 3 and by an L-shaped corner-profile rail 10 in FIG. 4. In order to prevent overloading of the securing element 5 in particular when the connecting device is installed in the position illustrated in FIG. 3, the connecting part 1 is provided with stops 11 and 12 which project into the interior of its eyelet 3 and, in conjunction with the outer surface 6 of the fastening part 2, prevent undesired movements between the connecting part 1 and the fastening part 2.

FIG. 4 shows that the stops 11, 12 may additionally be utilized for purposes of assigning connecting parts 1 and fastening parts 2 of the same load-bearing capacity, in that the distance X between the stops 11, 12 and pivot pin 4 of the fastening part 2 is coordinated with the wall thickness Y of the fastening part 2 such that it is not possible to combine a fastening part 2 of the load-bearing capacity n with a connecting part 1 of the next-lower load-bearing capacity n-1.

In order to avoid misunderstanding, it should be pointed out that FIG. 2, rather than showing the end state of the weld connection, also still has to have the right-hand leg 14 of the two legs 13, 14 of the fastening part 2 connected to the base 8 by a weld seam.

Figure 6:
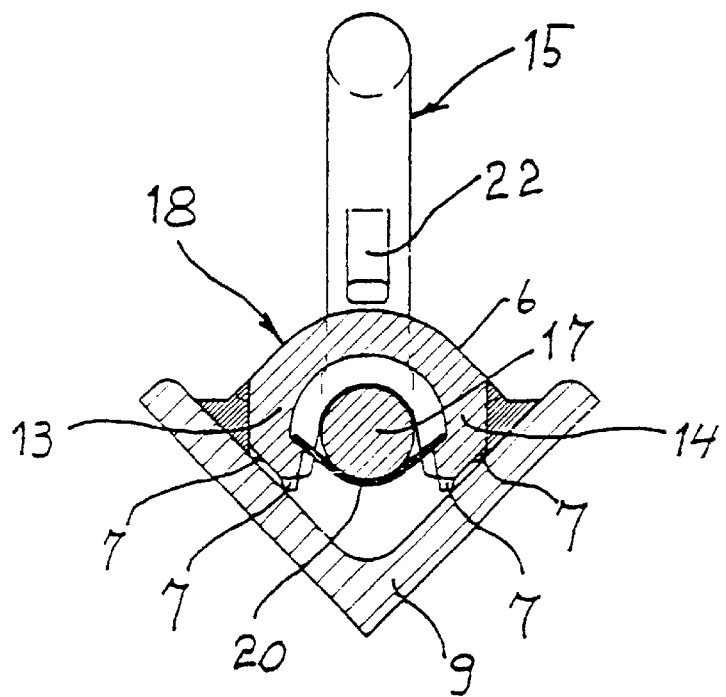
FIG. 6 shows a section, along line VI-VI in FIG. 5, through a connecting device according to FIG. 5 fastened in a V-shaped groove.

FIGS. 5 and 6 show a connecting device which is found to be expedient in cases in which large forces are introduced into the connecting part 15. The connecting part 15 has two stubs 16, 17 which form a pivot pin, project laterally beyond an essentially D-shaped basic body and are mounted in fastening parts 18, 19, which construction corresponds essentially to the construction of the fastening part 2. The fastening parts 18, 19 are thus also provided with spacing projections 7, which are distributed over their outer surface 6. In order to protect the securing element 20, which is formed in this case by a sheet-metal strip, against undesired deformation and/or displacement, the basic body of the connecting part 15 is also provided with stops 21, 22, although these, unlike those of the embodiment described above, are formed by outwardly directed protrusions.

In the case of both designs described, the legs 13, 14 of the U-shaped fastening parts 2 and 18, 19 have essentially parallel side surfaces which merge, via oblique surfaces oriented in the form of a V in relation to one another, into end surfaces which bound the ends of the legs. Each of the abovementioned surfaces is provided with spacing projections 7 which are spaced apart from one another, as seen in the direction of the pivot pins of the connecting parts 1 and 15.

What is claimed is:

1. A connecting device for binding or lashing means, said device having a connecting part (1; 15) for connecting the binding or lashing means, and at least one fastening part (2; 18, 19) for fastening the device on a base by a weld connection; said connecting part having a pivot pin for connecting said connecting part and said fastening part; said base forming a bearing for said pivot pin (4; 16; 17) of the connecting part (1; 15); said fastening part having a spacing projection (7) on an outer surface thereof for defining a minimum clearance for a root weld, characterized in that the outer surface (6) of the fastening part (2; 18, 19) is provided with a plurality of said spacing projections (7) for maintaining said minimum clearance without regard to the position of the fastening part (2; 18, 19) in relation to the base (8, 9, 10).

2. The device as claimed in claim 1, characterized in that the fastening part (2; 18, 19) is essentially U-shaped and has legs (13, 14) with essentially parallel side surfaces which merge, through oblique surfaces oriented in the form of a V in relation to one another, into end surfaces which bound the ends of the legs (13, 14), and two said spacing projections (7) spaced apart from one another, as seen in the direction of the pivot pin (4; 16, 17) of the connecting part (1; 15), provided on each of said end surfaces.

3. The device as claimed in claim 2, said device having a securing element for ensuring that the connecting part and the fastening part are held together, and for forcing the pivot pin of the connecting part against a bearing of the fastening part, characterized in that the connecting part (1; 15) has stops (11, 12; 21, 22) which limit deformation or changing position of the securing element (5; 20) and interact with the outer surface (6) of the fastening part (2; 18, 19).

4. The device as claimed in claim 3, characterized in that said connecting part is essentially D-shaped, and the pivot pin (4) is formed by a rectilinear section of-said essentially D-shaped connecting part (1).

5. The device as claimed in claim 4, characterized in that the stops (11, 12) are formed by aligned protrusions which project into the interior of an eyelet (3) of the essentially D-shaped connecting part (1).

6. The device as claimed in claim 3, characterized in that said connecting part is essentially D-shaped, and the pivot pin is formed by lateral stubs (16, 17) of said essentially D-shaped connecting part (15).

7. The device as claimed in claim 6, characterized in that the stops (21, 22) are formed by outwardly projecting, aligned protrusions of the D-shaped connecting part (15).

8. The device as claimed in claim 1, said device having a securing element for ensuring that the connecting part and the fastening part are held together, and for forcing the pivot pin of the connecting part against a bearing of the fastening part, characterized in that the connecting part (1; 15) has stops (11, 12; 21, 22) which limit deformation or changing position of the securing element (5; 20) and interact with the outer surface (6) of the fastening part (2; 18, 19).

9. The device as claimed in claim 8, characterized in that said connecting part is essentially D-shaped, and the pivot pin (4) is formed by a rectilinear section of said essentially D-shaped connecting part (1).

10. The device as claimed in claim 9, characterized in that the stops (11, 12) are formed by aligned protrusions which project into the interior of an eyelet (3) of the essentially D-shaped connecting part (1).

11. The device as claimed in claim 10, characterized in that the distance (X) between the stops (11, 12; 21, 22) and the pivot pin (4; 16, 17) of the connecting part (1; 15) and the wall thickness (Y) of the fastening part (2; 18, 19) are selected such that it is only possible to combine connecting parts (1; 15) with fastening parts (2; 18, 19) of the same load-bearing capacity.

12. The device as claimed in claim 9, characterized in that the distance (X) between the stops (11, 12; 21, 22) and the pivot pin (4; 16, 17) of the connecting part (1; 15) and the wall thickness (Y) of the fastening part (2; 18, 19) are selected such that it is only possible to combine connecting parts (1; 15) with fastening parts (2; 18, 19) of the same load-bearing capacity.

13. The device as claimed in claim 8, characterized in that said connecting part is essentially D-shaped, and the pivot pin is formed by lateral stubs (16, 17) of said essentially D-shaped connecting part (15).

14. The device as claimed in claim 13, characterized in that the stops (21, 22) are formed by outwardly projecting, aligned protrusions of the D-shaped connecting part (15).

15. The device as claimed in claim 14, characterized in that the distance (X) between the stops (11, 12; 21, 22) and the pivot pin (4; 16, 17) of the connecting part (1; 15) and the wall thickness (Y) of the fastening part (2; 18, 19) are selected such that it is only possible to combine connecting parts (1; 15) with fastening parts (2; 18, 19) of the same load-bearing capacity.

16. The device as claimed in claim 13, characterized in that the distance (X) between the stops (11, 12; 21, 22) and the pivot pin (4; 16, 17) of the connecting part (1; 15) and the wall thickness (Y) of the fastening part (2; 18, 19) are selected such that it is only possible to combine connecting parts (1; 15) with fastening parts (2; 18, 19) of the same load-bearing capacity.

17. The device as claimed in claim 8, characterized in that the distance (X) between the stops (11, 12; 21, 22) and the pivot pin (4; 16, 17) of the connecting part (1; 15) and the wall thickness (Y) of the fastening part (2; 18, 19) are selected such that it is only possible to combine connecting parts (1; 15) with fastening parts (2; 18, 19) of the same load-bearing capacity.

* * * * *